(12) United States Patent
Brambs et al.

(10) Patent No.: US 11,351,618 B2
(45) Date of Patent: Jun. 7, 2022

(54) METHOD FOR MATERIAL-REMOVING MACHINING OF FILLETS ON A WORKPIECE

(71) Applicant: OPEN MIND TECHNOLOGIES AG, Wessling (DE)

(72) Inventors: Peter Brambs, Munich (DE); Josef Koch, Munich (DE)

(73) Assignee: OPEN MIND TECHNOLOGIES AG, Wessling (DE)

( * ) Notice: Subject to any disclaimer, the term of this patent is extended or adjusted under 35 U.S.C. 154(b) by 111 days.

(21) Appl. No.: 16/335,894

(22) PCT Filed: Sep. 22, 2017

(86) PCT No.: PCT/EP2017/074144
§ 371 (c)(1),
(2) Date: Mar. 22, 2019

(87) PCT Pub. No.: WO2018/055143
PCT Pub. Date: Mar. 29, 2018

(65) Prior Publication Data
US 2020/0016669 A1   Jan. 16, 2020

(30) Foreign Application Priority Data
Sep. 22, 2016 (DE) ............... 10 2016 117 932.9

(51) Int. Cl.
*B23C 5/10* (2006.01)
*B23C 3/00* (2006.01)

(52) U.S. Cl.
CPC .............. *B23C 5/1009* (2013.01); *B23C 3/00* (2013.01); *B23C 5/10* (2013.01); *B23C 2220/04* (2013.01); *B23C 2265/08* (2013.01)

(58) Field of Classification Search
CPC ....... B23C 3/00; B23C 3/16; B23C 2210/084; B23C 2265/08
See application file for complete search history.

(56) References Cited

U.S. PATENT DOCUMENTS

| 4,533,286 | A | * | 8/1985 | Kishi | G05B 19/41 318/572 |
| 5,125,775 | A | * | 6/1992 | Breuer | B23C 5/10 409/132 |
| 6,684,742 | B1 | | 2/2004 | White | |
| 2001/0048857 | A1 | * | 12/2001 | Koch | G05B 19/4099 409/132 |

(Continued)

FOREIGN PATENT DOCUMENTS

| DE | 102015104679 B3 | 8/2016 |
| JP | H09201713 A | 8/1997 |

OTHER PUBLICATIONS

International Preliminary Report on Patentability issued for corresponding International Patent Application No. PCT/EP2017/074144 dated Feb. 18, 2019.

(Continued)

*Primary Examiner* — Nicole N Ramos
(74) *Attorney, Agent, or Firm* — Moore & Van Allen PLLC; Henry B. Ward, III

(57) ABSTRACT

A method is provided for the material-removing machining of fillets on a workpiece by means of a tool, more particularly a milling tool, which is guided over a fillet at a contact point. The invention is characterized in that the fillet is machined by means of a tool comprising a conical-convex cutting edge on a flank of the tool, wherein the tool, with the contact point on the conical-convex cutting edge, moves along at least one contact path running in the longitudinal direction of the fillet and the tool is inclined sideways in relation to the at least one contact path on the fillet such that a substantially sickle-shaped material engagement is formed in front of the contact point in the movement direction of the tool.

21 Claims, 12 Drawing Sheets

(56) References Cited

U.S. PATENT DOCUMENTS

| | | |
|---|---|---|
| 2009/0245959 A1 | 10/2009 | Hollmann et al. |
| 2009/0246032 A1 | 10/2009 | Stone et al. |
| 2011/0188959 A1* | 8/2011 | Brambs .................... B23C 3/00 |
| | | 409/132 |
| 2012/0282022 A1 | 11/2012 | Phebus et al. |
| 2013/0099477 A1* | 4/2013 | Horiguchi ............... B23C 5/109 |
| | | 285/179 |
| 2013/0177362 A1* | 7/2013 | Cigni ........................ B23C 5/02 |
| | | 409/125 |
| 2015/0078842 A1 | 3/2015 | Dieckilman |
| 2016/0265551 A1 | 9/2016 | Bailey |

OTHER PUBLICATIONS

International Search Report issued for corresponding International Patent Application No. PCT/EP2017/074144 dated Dec. 14, 2017.

Written Opinion issued for corresponding International Patent Application No. PCT/EP2017/074144 dated Dec. 14, 2017 (English language translation not attached).

CAM by Open Mind: "Workshop: High Speed Finishing; hyperMILL MAXX Machining; Mikron; Emuge-Franken; CAM-Software;", Youtube, Dec. 30, 2015 (Dec. 12, 2015), Seite 1 pp., XP054978947, Gefunden im Internet: URL: https://www.youtube.com/watch?v=gtALMIpnPtM (gefunden am Dec. 10, 2018).

CAM di Open Mind: "HyperMILL MAXX Machining: pezzo Aerospaziale in alluminio ; GROB", Youtube, Jun. 24, 2015 (Jun. 24, 2015), Seite 1 pp., XP054978946, Gefunden im Internet: URL: https://www.youtube.com/watch?v=ZtcMx3Xs2K0 (gefunden am Dec. 10, 2018).

OpenMindTechUSA: "hyperMILL MAXX Machining—Grob G550—Aerospace Structural Part", Youtube, Dec. 3, 2005 (Dec. 3, 2005), Seite 1 pp., XP054978945, Gefunden im Internet: URL: https://www.youtube.com/watch?v=mZxnhLJYZoc (gefunden am Dec. 10, 2018).

* cited by examiner

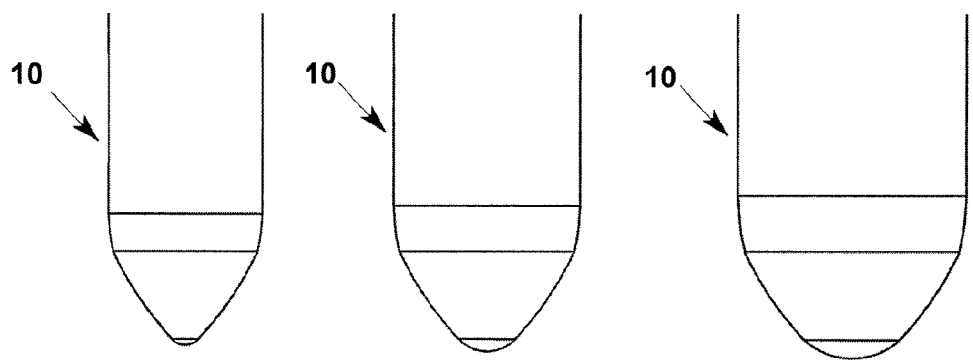
Fig. 4a    Fig. 4b    Fig. 4c
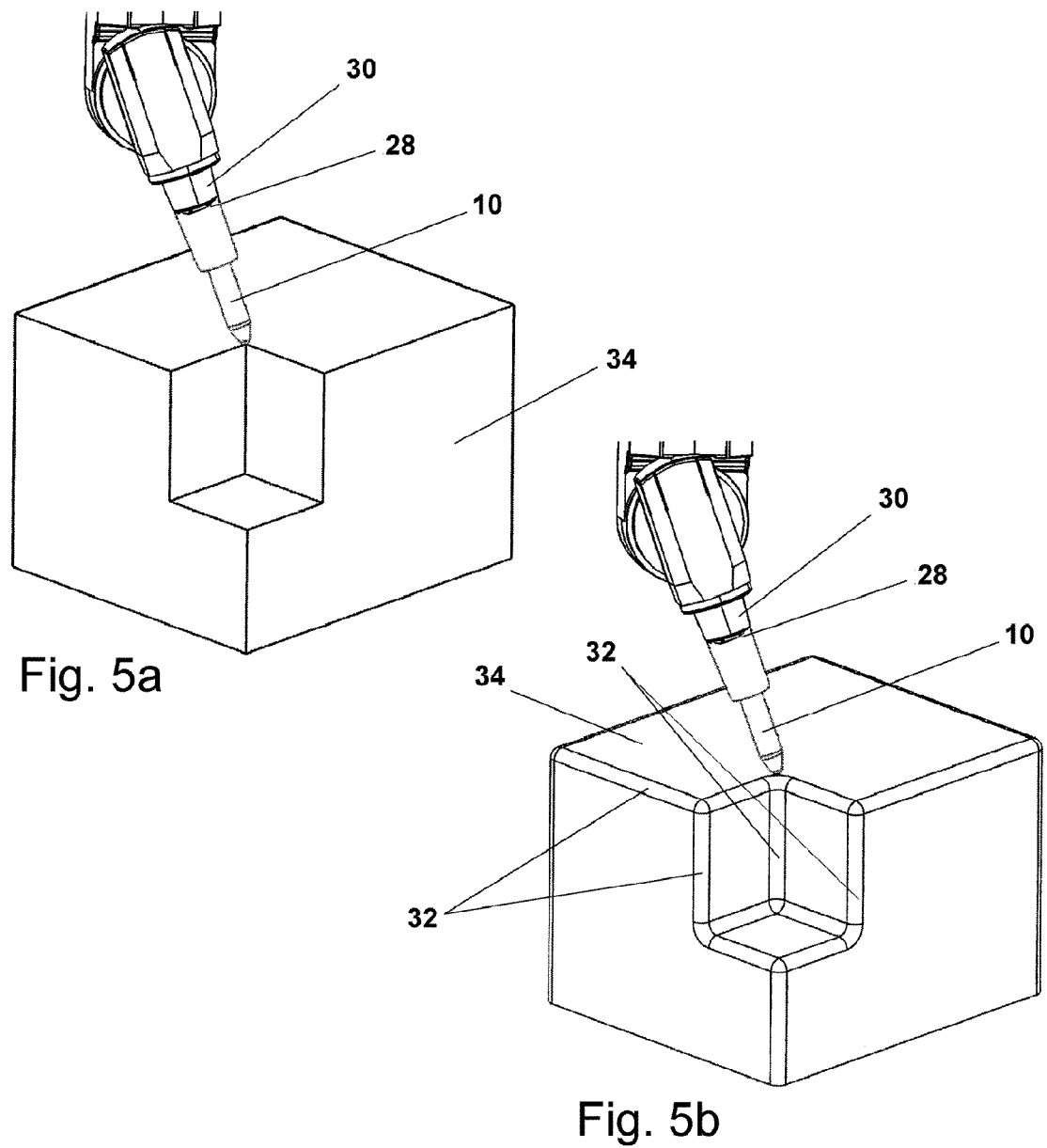
Fig. 5a
Fig. 5b

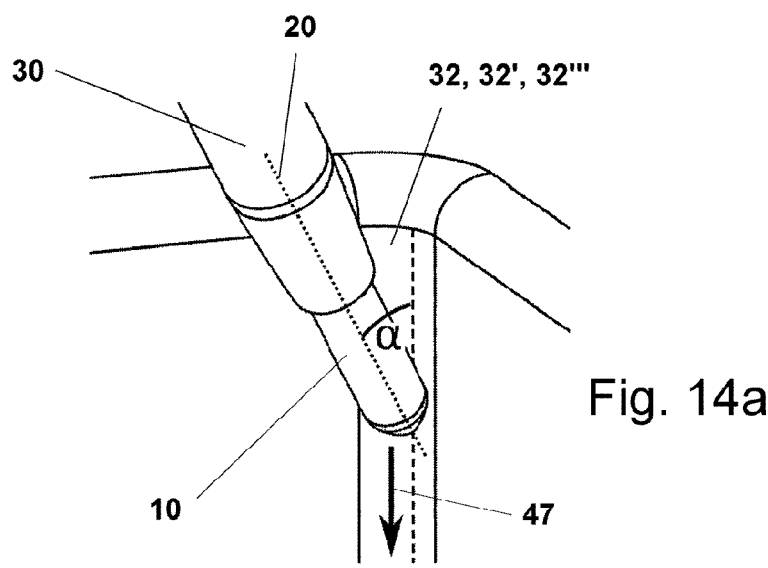
Fig. 14a
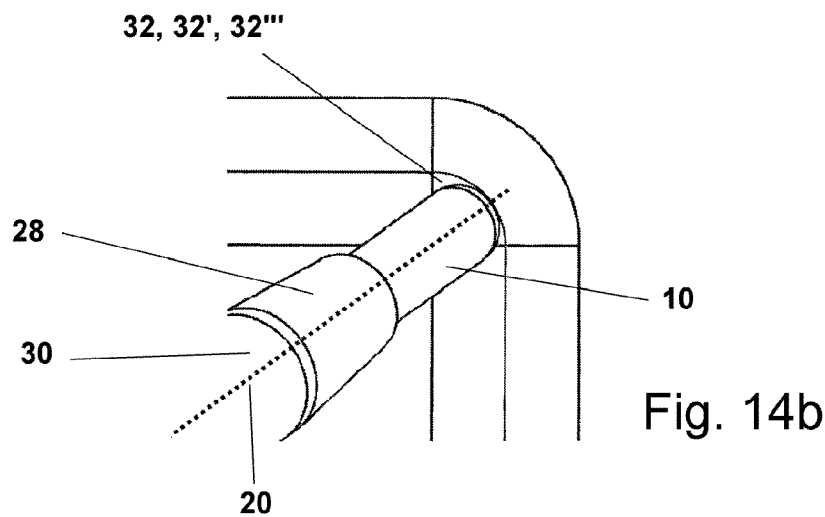
Fig. 14b
Fig. 15a  Fig. 15b  Fig. 15c
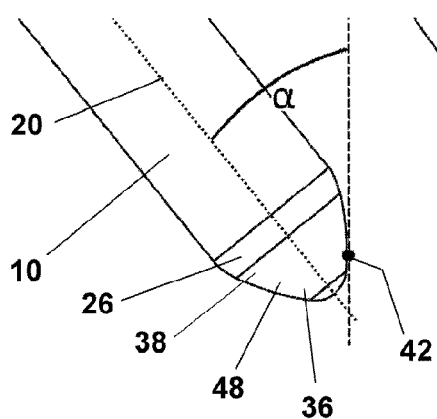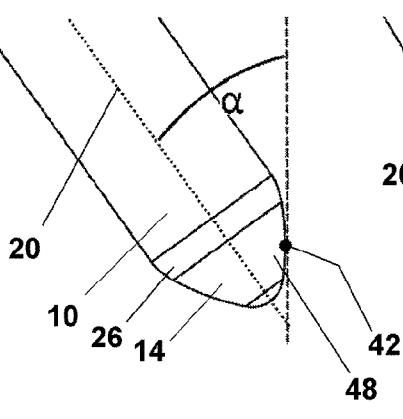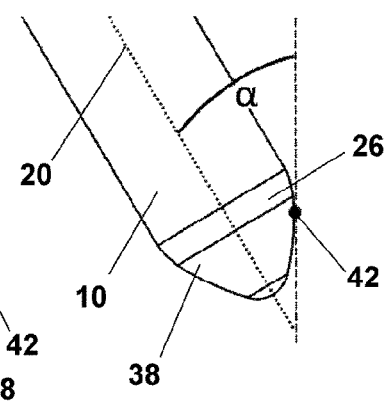

Fig. 18e
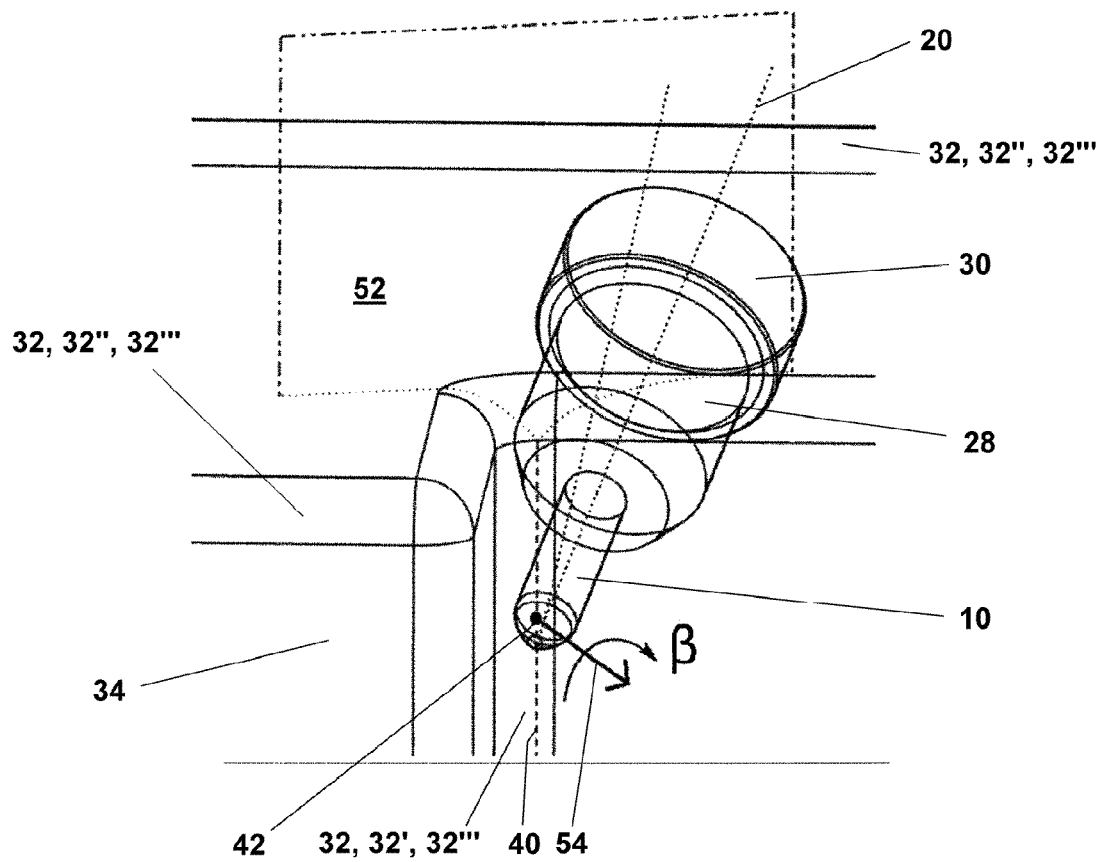
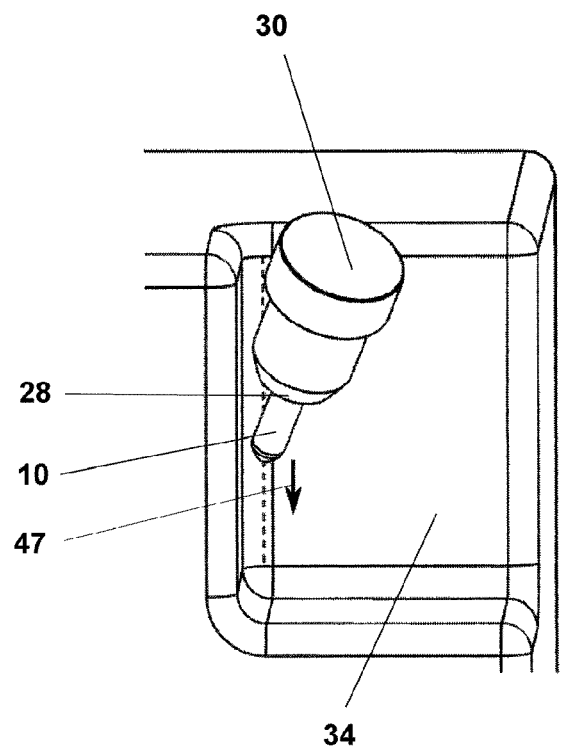
Fig. 18f

METHOD FOR MATERIAL-REMOVING MACHINING OF FILLETS ON A WORKPIECE

FIELD

The invention relates to a method for the material-removing machining of fillets on a workpiece by means of a tool, more particularly a milling tool.

BACKGROUND

Such rounded surfaces, or "fillets," are found particularly on many components in the tool and mold industry, but also, among others, in the turbomachinery industry. A fillet connects two adjoining component surfaces with a round, tangentially adjoining transition on both sides. One way to describe it is that the original boundary contour (corner) between two neighboring or adjoining component surfaces (common edge of the surfaces) are "rounded."

A method for the material-removing machining of such fillets on a workpiece by means of a milling tool, namely by means of a cherry, is known from JP 809-201713 A. This method is based on a prior art in which the machining lines run transverse to the longitudinal direction of the fillet. This results in high loads on the tool and also makes the machining itself extremely time-consuming. Instead, this method proposes a spiral-shaped tool path of the cherry in order to produce the fillet. This method has also proven to be disadvantageous in practice. For one, a spiral-shaped tool path is not very efficient, not least because of the many empty and air cuts. For another—and this seems essential—it is extremely disadvantageous that a cherry's feed rate is generally very limited. An excessive feed rate results in pronounced deflection of the cherry, thus causing process instability and poor surface quality. Due to the very limited feed rate, machining a fillet using a cherry is therefore extremely inefficient and costly. This is all the more true given that the path spacing during cherry machining is very small, meaning that the number of paths required is very high. Therefore, these known milling methods have substantial disadvantages in terms of technical feasibility, stability, and efficiency and, as a result, the cost involved.

Moreover, a wide variety of adaptive tool shapes have been proposed in the prior art for machining planar component surfaces, for example by DE 10 2 15 104 679 B3. It is not known to use such tool shapes for the machining of fillets.

BRIEF SUMMARY OF THE INVENTION

It is the object of the present invention to provide a method for the material-removing machining of fillets on a workpiece by means of a tool, in particular a milling tool, with which the above disadvantages can be avoided and which therefore enables fillets or rounded surfaces to be machined in an especially simple, quick, and yet practicable manner, makes it possible to obtain workpieces with a very high surface quality, and thus results in a substantial reduction in overall operating and manufacturing costs.

This object is achieved in a surprisingly simple manner by the features of a method for material-removing machining of fillets on a workpiece by means of a tool that is guided with a constant or varying contact point of the tool on a fillet, wherein the fillet comprises a juncture of two adjoining surfaces that define a corner having an angle therebetween such that the fillet connects the two adjoining surfaces of the workpiece with a round, tangentially adjoining transition on both sides of the fillet, the fillet being machined by means of the, wherein the tool has a conical-convex cutting edge contour on the flank of the tool, wherein the contact point of the tool is positioned on the conical-convex cutting edge contour on the flank of the tool, wherein the tool is moved with the contact point on a plurality of contact paths extending in a longitudinal direction of the fillet and is inclined sideways relative to the fillet, thus causing substantially sickle-shaped material engagement in the direction of movement of the tool in front of the contact point, the material engagement being formed between the contact point and at least one of a region of a lower end of the cutting edge contour or a region of an upper end of the cutting edge contour.

By virtue of the configuration of the method according to the invention for the material-removing machining of fillets on a workpiece by means of a tool, in particular a milling tool, that is guided with a contact point on a fillet, wherein the fillet is machined by means of a tool with a conical-convex cutting edge contour on a flank of the tool, and wherein the tool is moved with the contact point on the conical-convex cutting edge contour on at least one contact path extending in the longitudinal direction of the fillet and is inclined sideways relative to the at least one contact path of the fillet, thus causing substantially sickle-shaped material engagement in the direction of movement of the tool in front of the contact point and enabling fillets and rounded surfaces to be machined in an especially simple, quick, and yet practicable manner. At the same time, fillets can be achieved on the workpieces that have a very high surface quality. Ultimately, the method according to the invention contributes to a considerable reduction of operating and manufacturing costs and thus of the overall cost involved in the machining of fillets or rounded surfaces. Given how common rounded surfaces are on many components, a substantial overall improvement in the efficiency and cost-effectiveness of chip-removing machining can be achieved.

The tool, in particular the milling tool with the conical-convex cutting edge contour on a flank thereof, is of very great importance for the method according to the invention. Optimized tangential nestling of the cutting edge of the tool against the fillet and the creating of substantially sickle-shaped material engagement in the direction of movement of the tool in front of the contact point is made possible only by the conical-convex cutting edge contour. Such sickle-shaped material engagement is quite essential for the method according to the invention, since high-feed-like cutting conditions are achieved in this way. The tool with the conical-convex cutting edge contour can thus be moved at extremely high feed rates ("high feed") in the longitudinal direction of the fillet by means of quasi "piercing-type" (or "drawing-type") material-removing machining. The sickle-shaped material engagement and the high-feed-like cutting conditions prevent drifting of the tool and excessive heat from developing at these high speeds in an extremely effective manner which, in turn, results in high stability and thus high surface quality. It is possible to increase the feed rate by up to a factor of 10 compared to machining with a cherry. This results in considerable time savings.

What is more, the conical-convex cutting edge contour results in another advantage that is associated with the high-feed-like cutting conditions. The diameter of the tool is much smaller in the region of the cutting edge than in the region of the shank. This size ratio also results in less deflection, since the cutting forces can be better transferred into the shank. This results in greater stability of the tool, which has an extremely advantageous overall effect on the service life of the tool, particularly in high-speed machining.

Additional especially advantageous details of the method according to the invention are described below.

According to one embodiment, the tool is preferably guided over the fillet and inclined sideways relative to the fillet on the at least one contact path extending in the longitudinal direction of the fillet such that the contact point of the conical-convex cutting edge contour on the flank of the tool abuts against the fillet in a lower region facing toward the end face of the tool between the center of the cutting edge contour and end face of the tool.

Moreover, it lies within the scope of the invention for the tool according to another emobodiment to be guided over the fillet and inclined sideways relative to the fillet on the at least one contact path extending in the longitudinal direction of the fillet such that the contact point of the conical-convex cutting edge contour on the flank of the tool abuts against the fillet in a central region between shank and end face of the tool. The contact point is most preferably located in the center of the cutting edge.

Moreover, a provision is made according to the invention that the tool is guided over the fillet according to another embodiment on the at least one contact path extending in the longitudinal direction of the fillet such that the contact point of the conical-convex cutting edge contour on the flank of the tool abuts against the fillet in an upper region facing toward the shank of the tool between the center of the cutting edge contour and shank of the tool.

According to another embodiment, the contact point of the conical-convex edge contour on the flank of the tool is preferably maintained unchanged or partially or completely changed on the at least one contact path. As a result, the sideways inclination of the tool in relation to this or these contact path(s) is maintained constant during the entire machining operation or changed partially or completely, and vice versa.

Preferably, according to another embodiment, the contact point of the conical-convex cutting edge contour on the flank of the tool is varied individually on different contact paths.

According to the measures of another embodiment, it lies within the scope of the invention for the freedom from collisions and possible collisions with the geometry of the workpiece to be tested.

According to the measures of another embodiment, the workpiece is machined by the tool that is swiveled by a swivel angle parallel to the tangent plane at the contact point of the fillet in order to avoid a collision.

Preferably, according to another embodiment, the tool path(s) of the tool is/are calculated for the fillet.

The measures of another embodiment, according to which the tool is guided line by line over the fillet on contact paths extending in the longitudinal direction of the fillet, are of very particular interest.

In this context, it lies within the scope of the invention for the tool according to another embodiment to be guided unidirectionally and/or in a zigzag pattern and/or in mixed fashion over the fillet on contact paths extending in the longitudinal direction of the fillet.

According to another embodiment, the tool is guided over a fillet that is embodied as an internal or external rounded surface on contact paths extending in the longitudinal direction of the fillet, are particularly advantageous.

Moreover, it lies within the scope of the invention to guide the tool according to another embodiment over a fillet that is embodied as a singly or doubly curved rounded surface on contact paths extending in the longitudinal direction of the fillet in a linear or curved manner.

According to another embodiment, a provision is made according to the invention that the tool is guided over a fillet that extends vertically or substantially vertically on contact paths extending in the longitudinal direction of the fillet. A fillet that extends vertically or substantially vertically is most essential in promoting the alignment of the tool for close abutment. In other words, the method according to the invention is particularly suitable for fillets that are arranged or extend rather steeply than flatly.

The tool according to another embodiment is preferably moved over at least one row or layer on the at least one contact path extending in the longitudinal direction of the fillet.

In this context, the tool according to another embodiment is expediently moved over at least two rows or layers on the at least one contact path extending in the longitudinal direction of the fillet, with the number of contact paths of the at least two rows or layers being equal or variable.

If the number of at least two rows or layers is variable, the number of contact paths according to another embodiment can be preferably smaller in the case of an internal fillet as the spacing of the rows or layers from the internal fillet increases and larger in the case of an external fillet as the spacing of the rows or layers from the external fillet increases.

A further provision is made according to the invention that the tool according to another embodiment is guided over at least one surface adjoining the fillet on at least one contact path extending parallel to the longitudinal direction of the fillet.

Preferably, the fillet according to another embodiment is machined by means of a tool whose conical-convex cutting edge contour on the flank of the tool is formed by a conical contour with a cone angle between the conical contour and the axis of the tool and a convex bulge emanating from the conical contour.

According to another embodiment, the fillet is machined by means of a tool whose conical-convex cutting edge contour is formed on the flank of the tool as a circular segment, ellipse segment, or curve segment with a constant or varying radius of curvature.

Furthermore, the fillet according to another embodiment is advantageously machined by means of a tool whose conical-convex cutting edge contour is formed on the flank of the tool as a circular segment or ellipse segment with a small or smaller radius of curvature, particularly <250 mm, preferably ≤200 mm, most preferably ≤50 mm.

Moreover, a provision is very advantageously made according to the invention that the fillet according to another embodiment is machined by means of a tool whose conical-convex cutting edge contour is formed symmetrically or asymmetrically on the flank of the tool.

Preferably, the fillet is processed according to another embodiment by means of a tool whose conical-convex cutting edge contour on the flank of the tool transitions directly into the shank of the tool.

A provision is made according to the invention that the fillet according to another embodiment is machined by means of a tool whose conical-convex cutting edge contour on the flank of the tool transitions indirectly, as it were, into the shank of the tool via a rounded transition.

Finally, it still lies within the scope of the invention for the fillet according to another embodiment to be machined by means of a tool whose conical-convex cutting edge contour on the flank of the tool transitions into a flat end face or end side or end or tip of the tool.

Alternatively, the fillet can also finally be machined according to another embodiment by means of a tool whose conical-convex cutting edge contour on the flank of the tool transitions into a spherical end face or end side or end or tip of the tool.

BRIEF DESCRIPTION OF THE SEVERAL VIEWS OF THE DRAWINGS

Additional advantages, features and details of the invention follow from the following description of some preferred embodiments of the invention and from the drawings.

FIGS. 14a and 14b show a schematic, partially broken-away and enlarged perspective view of a workpiece with different fillet or rounded surfaces together with an inventive tool in order to explain another step of the method according to the invention, FIGS. 15a to 15c show schematic, partially broken-away side views orthogonal to the plane of inclination of the embodiment of the tool according to the invention with different inclinations relative to a fillet or rounded surface in order to explain the method according to the invention, FIGS. 18a to 18f show schematic, partially broken-away and enlarged perspective views of a workpiece with different fillet or rounded surfaces together with an inventive tool in order to explain yet another step of the method according to the invention.

DETAILED DESCRIPTION OF EMBODIMENTS OF THE INVENTION

Figure 1A:
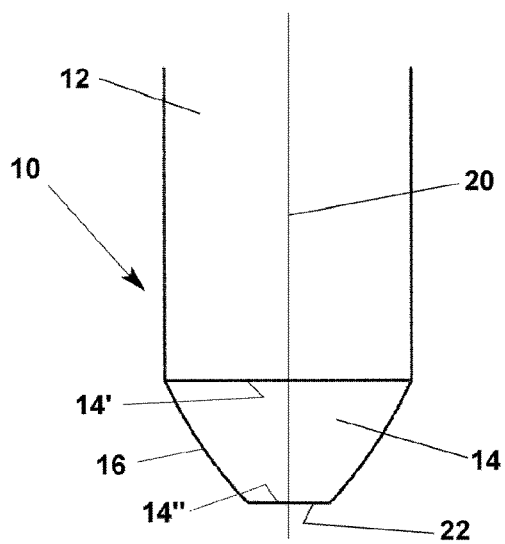
FIGS. 1a and 1b respectively show a schematic, partially broken-away side view of an embodiment of a tool according to the invention and a schematic, enlarged, partially broken-away side view of the embodiment of the inventive tool according to FIG. 1a, FIGS. 2a and 2b show schematic, partially broken-away side views of another embodiment of a tool according to FIGS. 1a and 1b, FIGS. 3a and 3b show schematic, partially broken-away side views of another embodiment of an inventive tool according to FIGS. 1a and 2a, FIGS. 4a to 4c schematic, partially broken side views of yet other embodiments of an inventive tool according to FIGS. 2a, 2b, and 3b, FIGS. 5a and 5b schematic, partially broken-away perspective views of a workpiece with a tool according to the invention, without and with fillets or rounded surfaces.

In the following description of various embodiments of a tool 10 embodied according to the invention and of a method according to the invention for material-removing machining by means of a tool 10, respective corresponding, identical components are provided with identical reference numerals. Without limiting the invention, the tool 10 can be embodied as a milling tool or milling cutter, for example.

Figure 1B:
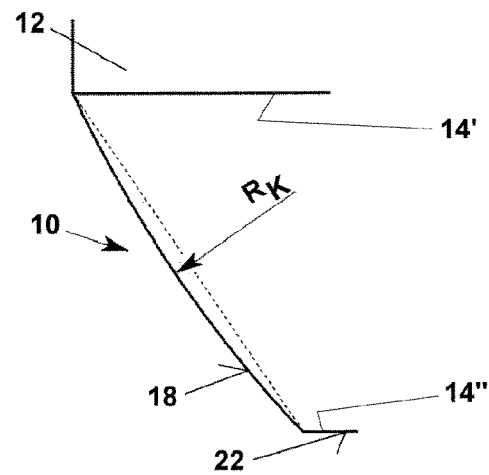

In the embodiment of a tool 10 provided for the method according to the invention that is shown in FIGS. 1a and 1b, in particular a milling tool, the tool 10 comprises a shank 12 and a cutting edge 14 adjoining the shank 12. The cutting edge 14 is arranged on a flank 16 of the tool 10 and is provided with a conical-convex cutting edge contour 18. The cutting edge is preferably relatively short.

The term "tool with conical-convex cutting edge contour" that has already been used above and will be used in the following thus refers to a tool 10 having a cone angle, i.e., the angle between the tool axis 20 of the tool 10 corresponding to the vertical in FIGS. 1b and 2b and the conical contour corresponding to the dashed line in FIGS. 1b and 2b, and a convex bulge of this contour is formed with a radius of curvature $R_K$.

The tool 10 thus has a cutting edge contour 18 having an almost conical shape that is not flatly (linearly) conical, but rather is slightly bulged in a slightly convex shape. The conical-convex cutting edge contour 18 on the flank 16 of the tool 10 is characterized by a conical contour with a cone angle between the conical contour and the axis 20 of the tool 10 and formed by a convex bulge emanating from the conical contour.

Furthermore, the conical-convex cutting edge contour 18 can be advantageously formed on the flank 16 of the tool 10 as a circular segment, ellipse segment, or curve segment with a constant or varying radius of curvature $R_K$.

A conical-convex cutting edge contour 18 on the flank 16 of the tool 10 that is embodied as a circular segment or ellipse segment with a small or smaller radius of curvature $R_K$, particularly $R_K < 250$ mm, preferably $R_K \leq 200$ mm, most preferably $R_K \leq 50$ mm, has proven to be especially advantageous.

In the present embodiment according to FIGS. 1a and 1b, the conical-convex cutting edge contour 18 on the flank 16 of the tool 10 is symmetrical, i.e., embodied such that deviation from the flat or straight profile is greatest in the center. However, although not shown in detail, the conical-convex cutting edge contour 18 can also be asymmetrical.

As shown in FIGS. 1a and 1b, the conical-convex cutting edge contour 18 is arranged on the flank 16 of the tool 10 directly adjacent to the shank 12 of the tool 10.

In addition, the conical-convex cutting edge contour 18 transitions into a flat end face 22 or end side or end of the tool 10, merges into same, as it were.

The cutting edge 14 with the conical-convex cutting edge contour 18 thus extends between the upper end 14' of the cutting edge 14 and the lower end 14" of the cutting edge 14.

Figure 2A:
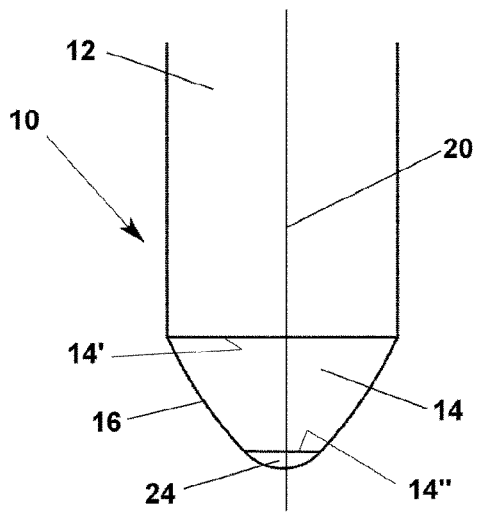
Figure 2B:
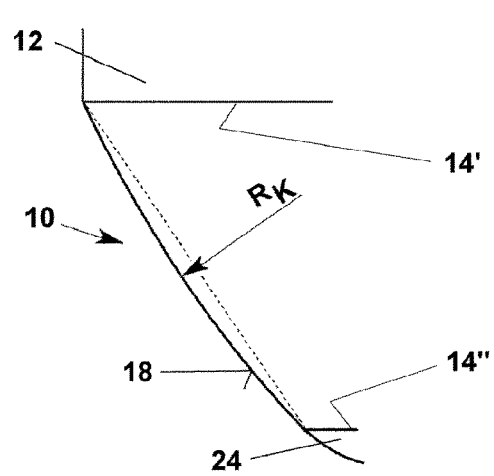

The embodiment of the tool 10 provided for the method according to the invention that is shown in FIGS. 2a and 2b differs from that of FIGS. 1a and 1b only in that, instead of a flat end face 22, the tool 10 additionally has a spherical end face 24 or end side or end or tip. The conical-convex cutting edge contour 18 thus transitions into a spherical end face 24 or end side or end or tip of the tool 10.

Figure 3A:
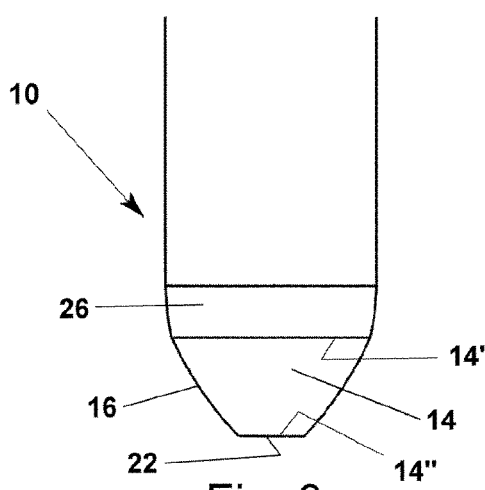
Figure 3B:
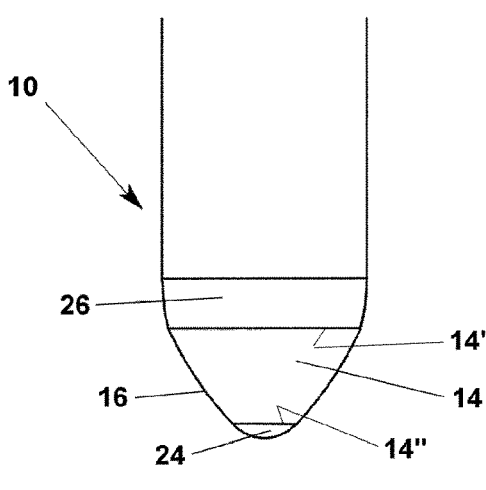

FIGS. 3a and 3b show another embodiment of the tool 10 provided for the method according to the invention in which the conical-convex cutting edge contour 18 on the flank 16 of the tool 10 is arranged so as to be indirectly adjacent to the (non-cutting) shank 12 of the tool 10. In this case, an additional, rounded transition 26 between the shank 12 and the flank 16 of the tool 10 is provided.

According to FIGS. 4a to 4c, the diameter of the tool 10 is independent of the radius of curvature $R_K$ of the conical-convex cutting edge contour 18 and can therefore be varied as desired. FIGS. 4a to 4c show tools 10 with different diameters. The diameter of the tool 10 increases from the embodiments of FIG. 4a and FIG. 4b to FIG. 4c. The radius of curvature $R_K$ and the height or length of the cutting edge 14 are constant.

When used on the machine, the tool 10, as shown schematically in FIG. 5a, is fixed over the shank 12 in a tool holder 28 which, in turn, is attached to the machine spindle 30. The holder geometry is type-dependent. The projecting length, i.e., the length by which the tool 10 protrudes from the tool holder 28, is variable.

The method according to the invention is very advantageously suited for material-removing machining and most preferably here for the material-removing finish and pre-finish machining of fillets 32 or rounded surfaces on a workpiece 34 by means of a tool 12, particularly in the form of a milling tool. The cutting edge 14 of the tool 10 has a conical-convex shape that is exploited in order to achieve efficient and collision-free 5-axis machining of the fillets 32 or rounded surfaces.

FIGS. 5a and 5b each show a workpiece 34 without and with fillets 32 or rounded surfaces.

As shown in FIG. 5a, the workpiece 34 is formed without fillets 32 or rounded surfaces. The original boundary contour in the form of a common edge (corner) of the surfaces is (still) maintained between the individual adjacent, mutually adjoining surfaces of the workpiece 34.

In contrast, a workpiece 34 is shown in FIG. 5b that is provided with fillets 32 or rounded surfaces. Fillets 32 or rounded surfaces can be found on many workpieces 34 or components, particularly in the tool and mold industry and in the turbomachinery industry as well. The fillet 32 or rounded surface connects two adjoining surfaces of the workpiece 34 with a round, tangentially adjoining transition on both sides. The original boundary contour between the two surfaces is "rounded" in accordance with FIG. 5a.

The fillets 32 are usually already included in the CAD model of the workpiece 34 or component, i.e., defined before the actual production. The fillets 32 are thus generally generated as new surface elements starting from a CAD model without rounded surfaces as shown in FIG. 5a by applying one or more rounding operations in the model. However, a method is also possible in which the fillets 32 are not explicitly generated in the model but rather are only implicitly represented, for example mathematically, as supplementary information for the original CAD model.

Figure 6A:
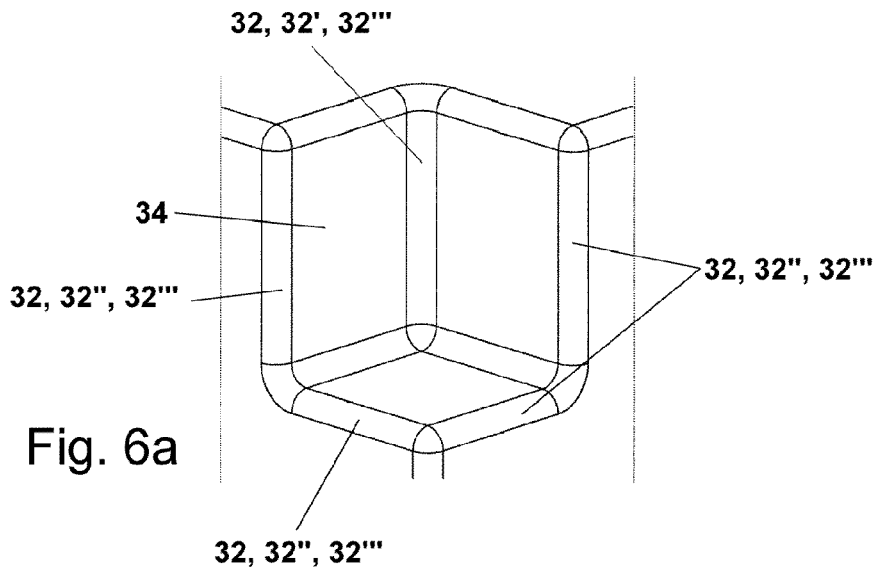
FIGS. 6a to 6d show schematic, enlarged, partially broken-away perspective views and plan views of various fillets or rounded surfaces, inter alia, of the workpiece according to FIG. 5b, FIGS. 7a and 7b show schematic, partially broken-away and enlarged perspective views of a workpiece with different fillet or rounded surfaces in order to explain a step of the method according to the invention.
Figure 6B:
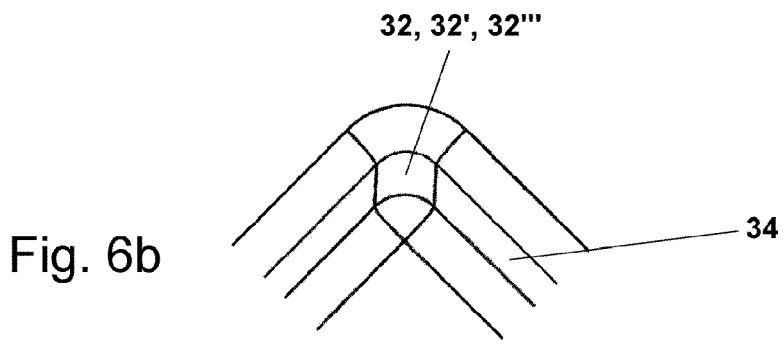

As can be seen in FIGS. 6a and 6b, the fillet 32 may be an internal fillet 32', or concave fillet, or an external fillet 32", or convex fillet, respectively. This depends on whether the boundary contour is on the inside or outside. In practice, internal fillets 32' or concave rounded surfaces are usually of greater importance in the interest of efficient production.

Figure 6C:
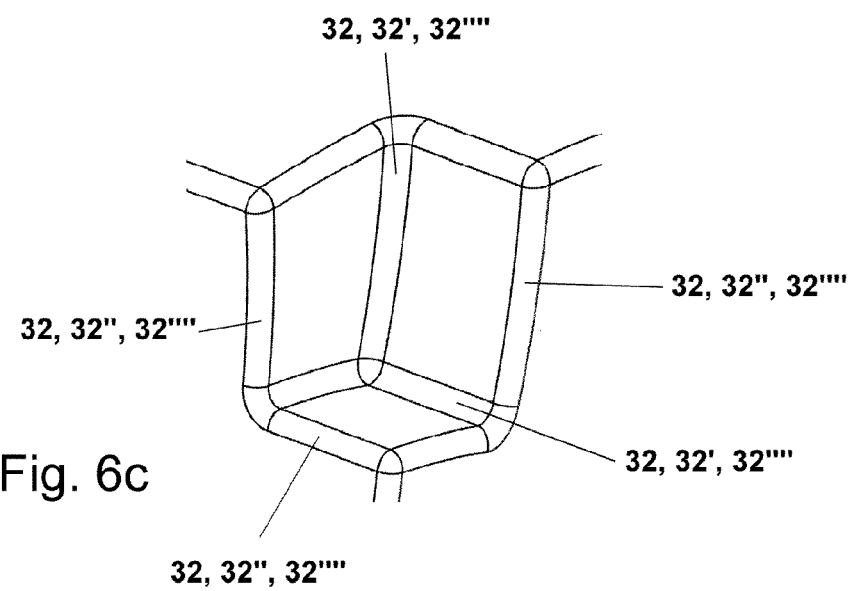

A distinction is also made with respect to fillets between a singly curved fillet 32''' corresponding to FIG. 6a and 6b and a twice- or doubly curved fillet 32" corresponding to FIG. 6c.

As can be seen from FIGS. 6 and 6b, the fillet 32 usually connects two flat surfaces to one another and is therefore only singly curved. The fillet 32 according to FIGS. 6a and 6b is therefore an external fillet 32'—or concave rounded surface—or an external fillet 32"—or convex rounded surface—and at the same time a singly curved fillet 32'.

When curved surfaces are connected, the fillet 32 is twice- or doubly curved. In FIG. 6c, the fillet 32 is thus an internal fillet 32'—or concave rounded surface—or an external fillet 32"—or convex rounded surface—and at the same time a twice- or doubly curved fillet 32".

Moreover, it can be seen from FIGS. 6a to 6c that, for example, the internal fillet 32' or external fillet 32" is freely accessible from above, whereas another optionally planar or curved surface—a bottom surface, as it were—adjoins the bottom region.

Figure 6D:
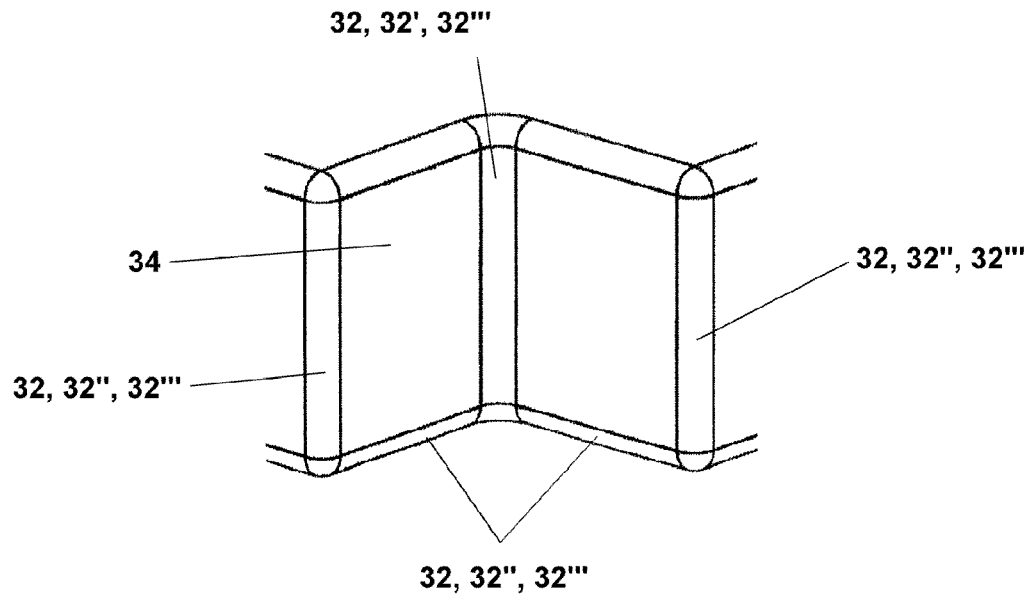

In contrast, FIG. 6d illustrates a case in which an internal fillet 32' or external fillet 32" is freely accessible from below. Another optionally planar or curved surface—a bottom surface, as it were, like in the workpiece of FIG. 34—is therefore not present.

The method according to the invention is composed of the following individual method steps which, without being limited thereto, are explained in greater detail purely by way of example with reference to the particularly advantageous embodiment of the tool 10 according to the invention with a spherical end face 24 and a rounded transition 26. In one exemplary embodiment that is likewise given purely for the sake of example, the cutting edge 14 with conical-convex cutting edge contour 18 is embodied such that the deviation from the flat profile is greatest in the center of the cutting edge 14:

In a first step, the essential parameters—namely the radius of curvature $R_K$ of the cutting edge 14 with conical-convex cutting edge contour 18, the tool radius at the lower end 14" of the cutting edge 14 and at the upper end of the spherical end face 24, and the tool radius at the upper end 14' the cutting edge 14 or at the lower end of the shank 12 and the rounded transition 26 toward the shank 12—are determined.

The tool parameters are selected as a function of the geometry of the fillet 32, in particular the angle (opening angle of the fillet) and the radius of the surface.

The radius of curvature $R_K$ of the cutting edge 14 is always less than 250 mm in order to reliably achieve the advantageous high-feed cutting conditions with sickle-shaped material engagement. In particular, a radius of curvature $R_K$ of the cutting edge 14 that is equal to or less than 200 mm, most preferably equal to or less than 50 mm, has been found to be especially advantageous in practice.

The tool radius at the lower end 14" of the cutting edge 14 must be smaller than the radius of the fillet 32 in order to obtain close abutment of the cutting edge 14 against the fillet 32, but it should also not be selected so small as to provide inadequate path spacing.

The tool radius at the upper end 14' of the cutting edge 14 or at the lower end of the transition 26 to the shank 12 of the tool 10 can be greater than the radius of the fillet 32 if a contact point 42 near the upper end 14' of the cutting edge 14 is not indispensable for the machining.

In a second step, at least one contact path 40 on the fillet 32 is determined on which the motion control of the tool 10 is essentially based. A contact path 40 determines the intended trajectory of the contact point 42 of the cutting edge 14 on the fillet 32 during a machining pass. The number and spacing of the contact paths 40 are variable and are determined such that the fillet 32 can be worked out completely in consideration of the tool geometry and with the necessary surface quality.

Figures 7A, 7B:
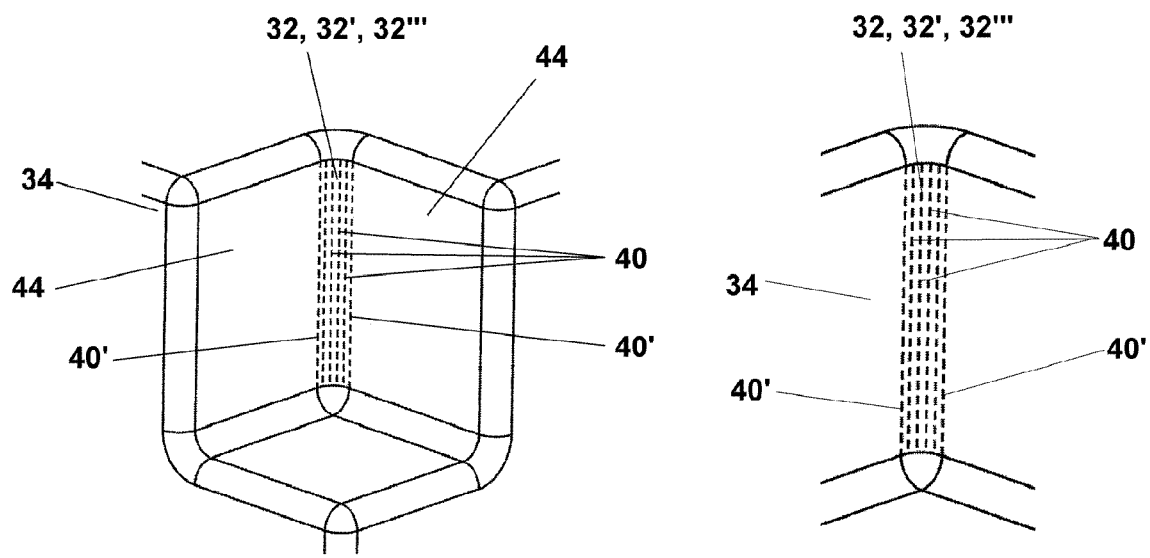

FIGS. 7a and 7b show an embodiment of a fillet 32 that is embodied as an internal fillet 32' or concave rounded surface and, at the same time, as a singly curved fillet 32'''. In this case—and as will also be the case below—six contact paths 40, 40' are provided for the machining and production of the fillet 32 with constant spacing. The four contact paths 40 lie in the interior of the fillet 32 and are surrounded, so to speak, by two external contact paths 40'. The two external or outermost contact paths 40' at the left and right usually coincide with the lateral boundary lines of the fillet 32, as can be seen in the example.

In the case of a singly curved fillet 32', the contact path(s) 40, 40' is/are embodied as a straight line or straight lines. The contact path(s) 40, 40' extending in the longitudinal direction of the singly curved fillet 32' coincides or coincide with the longitudinal direction or is/are arranged parallel thereto.

As further illustrated in FIGS. 8a to 8d, the directions of passage and the passage sequence of four contact paths 40, 40' are freely selectable in all embodiments of the second step of the method according to the invention.

Figures 8A, 8B, 8C, 8D:
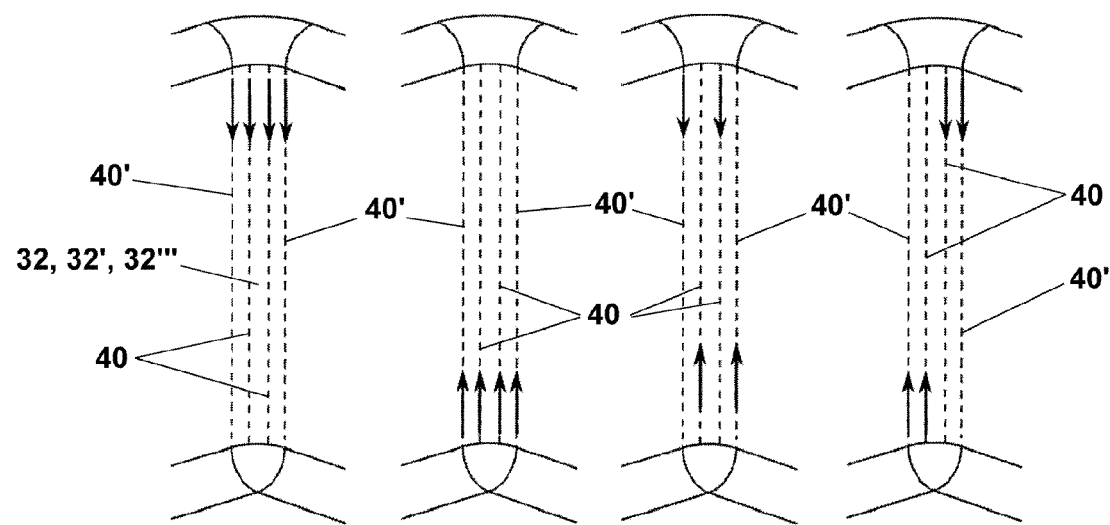
FIGS. 8a to 8d show schematic, partially broken-away and enlarged perspective views of a workpiece with different fillets or rounded surfaces in order to explain another step of the method according to the invention.

Unidirectional machining operations as shown in FIGS. 8a and 8b, machining in a zigzag pattern as shown in FIG. 8c, and mixed machining operations, an example of which is illustrated in FIG. 8d, are thus possible.

The example, four contact paths 40, 40' can be traversed either from top to bottom (piercing-type machining) or from bottom to top (drawing-type machining). It is advantageous in all cases to execute the contact paths 40, 40' successively from one side to the other side—i.e., from left to right, for example, or vice versa. Although not shown in detail, any other directions of passage, passage sequences, and combinations of contact paths 40, 40' are readily possible. The number of contact paths 40, 40' can be varied as desired.

Returning to FIGS. 7a and 7b, the two outermost contact paths 40' at the left and right usually coincide with the lateral boundary lines of the fillet 32, as can be seen in the example. Adjoining surfaces 44 of the workpiece 10 have already been machined previously.

Figure 9:
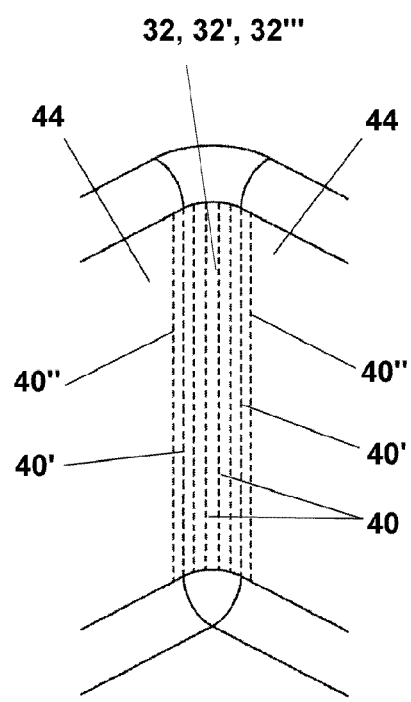
FIG. 9 shows a schematic, partially broken-away and enlarged perspective view of a workpiece with different fillets or rounded surfaces in order to explain a step of the method according to the invention.

However, in a particular embodiment of the method according to the invention that is shown in FIG. 9, additional contact paths 40" can be advantageously defined in adjacently adjoining edge regions of adjoining surfaces 44 of the workpiece 34. Through this widening of the machining area, material residues on these surfaces 44 of the workpiece 34 or on the region of transition to the fillet 32 remaining from previous machining phases can be removed simultaneously.

FIG. 9 shows an embodiment of a fillet 32 that is embodied as an internal fillet 32' or concave rounded surface and, at the same time, as a singly curved fillet 32'.

In FIG. 9, a respective additional contact path 40" is provided on the left and right adjoining surfaces 44 of the workpiece 34. In the present embodiment, the additional contact paths 40" are adjacent to the respective two outermost contact paths 40' on the left and right. Although not shown in detail, it is also conceivable for a plurality of such contact paths 40" to be provided on the left and right, for only one or a plurality of such additional contact paths 40" to be provided only on the left and/or right, etc.

In all previously proposed embodiments of the inventive method of FIGS. 6a to 9, the tool 10 is moved over a row 46 or layer on the at least one contact path 40, 40', 40" extending in the longitudinal direction of the fillet 32.

Figures 10A, 10B:
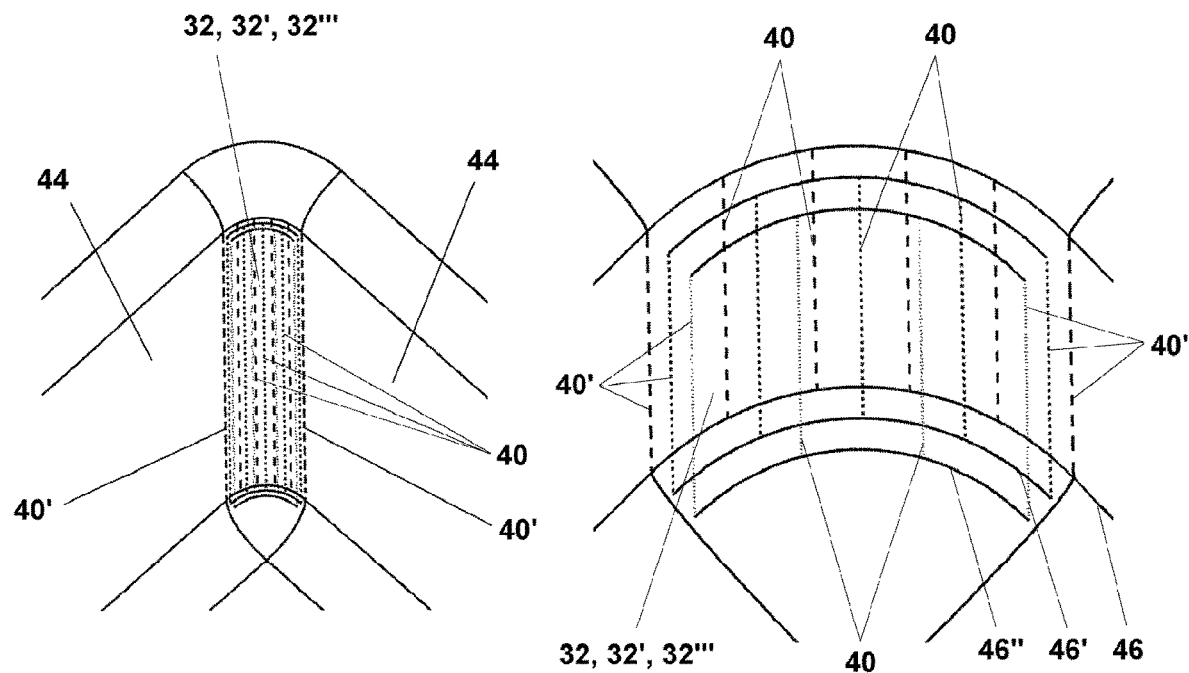
FIGS. 10a and 10b show schematic, partially broken-away and enlarged perspective views of a workpiece with different fillet or rounded surfaces in order to explain a step of the method according to the invention.

In another particular embodiment of the method according to the invention corresponding to FIGS. 10a and 10b, the fillet 32 is likewise embodied as an internal fillet 32' or concave rounded surface and, at the same time, as a singly curved fillet 32".

According to the embodiment of the method according to the invention that is shown in FIGS. 10a and 10b, the tool 10 can be moved over at least two—i.e., two or more—rows 46, 46', 46" or layers on the at least one contact path 40, 40' extending in the longitudinal direction of the fillet 32. In the exemplary embodiment of FIGS. 10a and 10b, a total of three rows 46, 46', 46" or layers are provided.

In other words, additional contact paths 40, 40' can be provided in an outer region in front of the fillet 32. These are arranged in successive rows 46, 46', 46" or layers at an increasing distance from the fillet 32, with the rows 46, 46', 46" or layers being machined according to their distance from the fillet 32, i.e., starting from the row 46", continuing with row 46', and ending with the row 46. This embodiment is especially suitable for pre-finish machining, in which a larger volume of material remaining after rough machining must be removed. In preparation for finish machining, the layer of material on the fillet 32 is first reduced to a dimension that is suitable for finishing.

As FIGS. 10a and 10b make clear, the number of contact paths 40, 40' per row 46 or layer is variable but usually becomes smaller in the case of the illustrated internal fillet 32' or concave rounded surface with increasing spacing of the rows 46, 46', 46" or layers of the fillet 32 and internal fillet 32'. In the embodiment of FIGS. 10a and 10b, the outermost row 46" has four contact paths 40, 40', for example (see finely dotted lines), the middle row 46' has five contact paths 40, 40', for example (see coarsely dotted lines), and the inner row 46 has a total of six contact paths 40, 40' (see dashed lines). The contact paths 40, 40' of each of the rows 46, 46', 46" are shown with different dotted/dashed lines in FIGS. 10a and 10b.

As a result of the execution of the additional rows 46', 46" of contact paths 40, 40', intermediate surfaces occur in the method according to the invention in front of the actual fillet 32 whose upper and lower boundaries are indicated by solid lines in the example in FIGS. 10a and 10b.

The fillet 32 of the embodiment of FIG. 11 is again an internal fillet 32' or concave rounded surface and, at the same time, a singly curved fillet 32'''.

Figure 11:
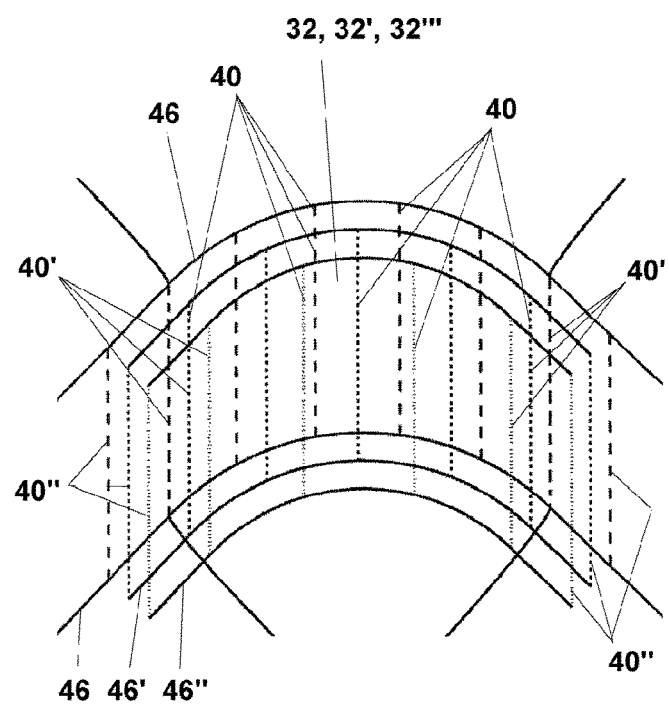
FIG. 11 shows a schematic, partially broken-away and enlarged perspective view of a workpiece with different fillets or rounded surfaces in order to explain a step of the method according to the invention.

As can be seen from FIG. 11, the embodiment of the method according to the invention according to FIGS. 10a and 10b can be easily combined with the embodiment according to FIG. 9, in which additional contact paths 40" are defined in adjacently adjoining edge regions of adjacent surfaces 44 of the workpiece 34. As a result, a plurality—three in this case again—of rows 46, 46', 46" of contact paths 40, 40', 40" are determined, with additional contact paths 40" being respectively set up at the sides of the fillet 32 that lie near the adjoining surfaces 44 of the workpiece 34.

In the embodiment of FIG. 11, two additional contact paths 40" are present in each row 46, 46', 46". The outermost row 46" thus has six contact paths 40, 40', 40", for example (see finely dotted lines), the middle row 46' has seven contact paths 40, 40', 40", for example (see coarsely dotted lines), and the inner row 46 has a total of eight contact paths 40, 40', 40" (see dashed lines). The contact paths 40, 40' of each of the rows 46, 46', 46" are again shown with different dotted/dashed lines in FIG. 11.

Figure 12A:
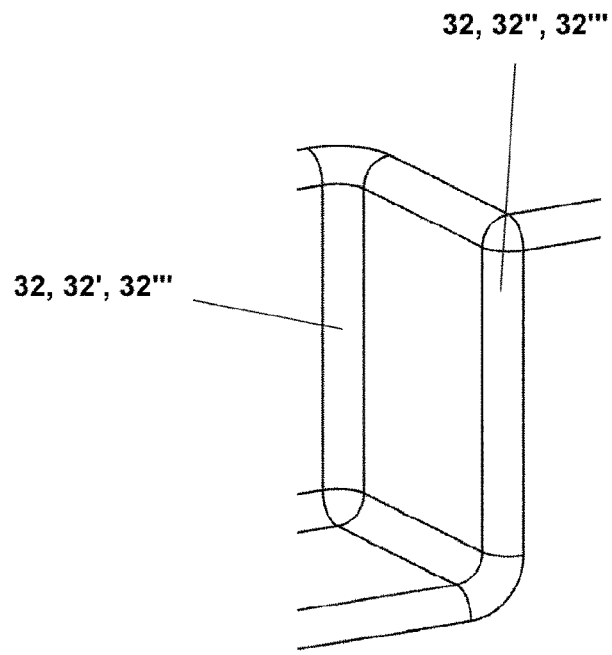
FIGS. 12a and 12b show schematic, partially broken-away and enlarged perspective views of a workpiece with different fillet or rounded surfaces in order to explain a step of the method according to the invention.
Figure 12B:
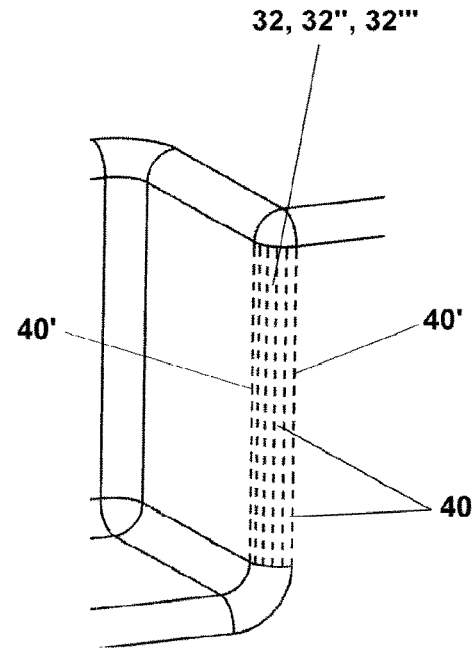

FIGS. 12a and 12b show an embodiment of a fillet 32 that is embodied as an external fillet 32" or convex rounded surface and, at the same time, as a singly curved fillet 32'''. Six contact paths 40, 40' are again provided here for the machining and production of the fillet 32 with constant spacing. In the case of a singly curved fillet 32", the contact path(s) 40, 40', 40" is/are embodied as a straight line or straight lines. The contact path(s) 40, 40', 40" extending in the longitudinal direction of the singly curved fillet 32''' coincides or coincide with the longitudinal direction or is/are arranged parallel thereto.

Although not shown in detail, the number of contact paths 40, 40', 40" of two or more provided rows or layers 46, 46', 46" preferably becomes greater in the case of such an external fillet 32" or convex rounded surface as the distance of the rows 46, 46', 46" from the fillet 32 increases. The rows 46, 46', 46" or layers are again machined according to their distance from the fillet 32—i.e., starting with the row 46", continuing with the row 46', and ending with the row 46.

Nevertheless, it is also possible to keep the number of contact paths 40, 40', 40" of some or all of the at least two rows 46, 46', 46" or layers the same if such an arrangement turns out to be (especially) expedient or necessary.

Figure 13A:
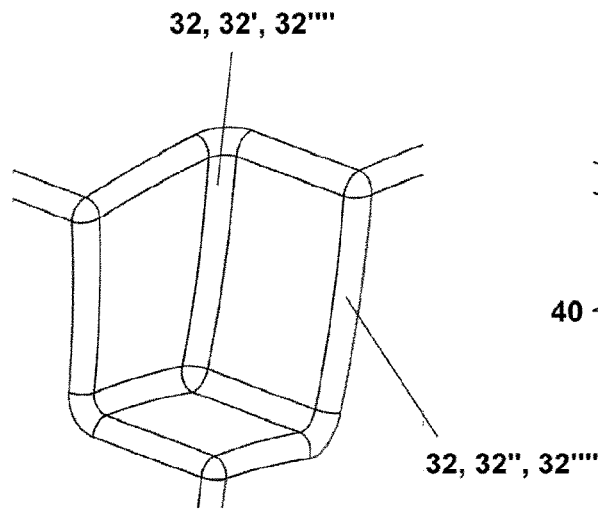
FIGS. 13a and 13b show schematic, partially broken-away and enlarged perspective views of a workpiece with different fillet or rounded surfaces in order to explain a step of the method according to the invention.
Figure 13B:
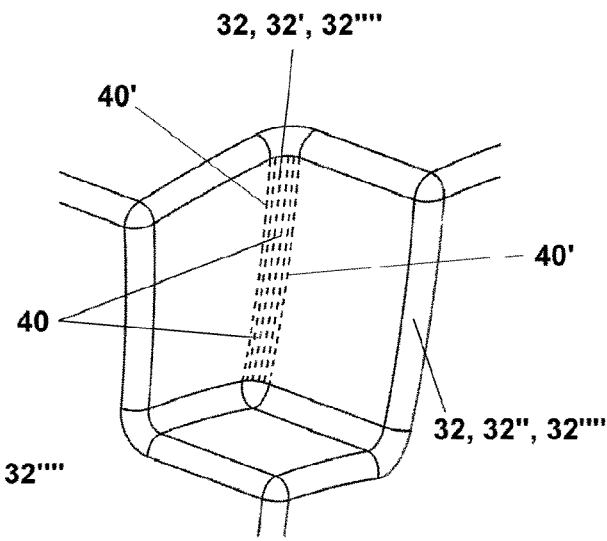

FIGS. 13a and 13b show an embodiment of a fillet 32 that is embodied as an internal fillet 32' or concave rounded surface and, at the same time, as a twice- or doubly curved fillet 32'''. Six contact paths 40, 40' are again provided here for the machining and production of the fillet 32 with constant spacing. In the case of a doubly curved fillet 32''', however, the contact path(s) 40, 40', 40" is/are not embodied as a straight line or straight lines, but rather as a curve or curves. The contact path(s) 40, 40', 40" extending in the longitudinal direction of the doubly curved fillet 32'''' coincides or coincide with the longitudinal direction or is/are arranged parallel thereto.

Although not shown in detail, the second step, as explained in connection with the various embodiments of the method according to the invention shown in FIGS. 7a to 13b, can be carried out at any time and without any limitation to any other configurations and embodiments of fillets 32 or rounded surfaces and combinations thereof.

In a third step, the sideways inclination α of the tool 10 relative to the fillet 32, 32', 32", 32''', 32''''—i.e., the inclination α away from the fillet 32—is determined according to FIGS. 14a to 17c. The aim here is to cause the tool 10, more particularly the conical-convex cutting edge contour 18, to abut closely and tangentially against a contact path 40, 40', 40" and hence against the fillet 32 by adjusting the inclination α or setting a suitable lateral angle of attack α relative to a contact path 40, 40', 40" (i.e., in the direction of the local normal vector of the fillet 32). This determines a contact point 42 on the cutting edge 14 with which the tool 10 is guided along the contact path 40, 40', 40".

In the embodiment according to FIG. 14a, the tool 10 is moved vertically or substantially vertically from top to bottom in the direction of the arrow 47, which results in "piercing-type" machining. Although not shown in detail, the tool 10 can be moved vertically or substantially vertically from the bottom to the top in the direction opposite that indicated by the arrow 47, resulting in "drawing-type" machining.

As shown schematically by FIGS. 15a to 15c, the lateral inclination a relative to the vertical—or, in the present exemplary embodiment, relative to the vertically extending fillet 32—is set such that the cutting edge contour 18 of the tool 10 contacts the fillet 32 at a contact point 42.

The conical-convex shape 18 of the cutting edge 14 limits the angle of inclination α to a relatively small interval. The choice of the angle of inclination α within this interval is arbitrary and determines the exact position of the contact point 42 on the tool 10.

Advantageous contact points 42 are shown through selection of corresponding angles of inclination α in FIGS. 15a to 15c:

In FIG. 15a, the contact point 42 of the conical-convex cutting edge contour 18 is located on the flank 16 of the cutting edge 14 of the tool 10 on the fillet 32 in a lower region 36 of the cutting edge 14 facing toward the end face 24 or end side or end or tip of the tool 10. In the embodiment of FIG. 15a, the contact point 42 is arranged between the center of the cutting edge 14 and the end face 24 or end side or end or tip.

In FIG. 15b, the contact point 42 of the conical-convex cutting edge contour 18 lies on the fillet 32 in a center region 48 between shank 12 or transition 26 and end face 22, 24 of the tool 10. In the embodiment of FIG. 15b, the contact point 42 is located exactly in the middle of the cutting edge 14.

In FIG. 15c, the contact point 42 of the conical-convex cutting edge contour 18 lies on the fillet 32 in an upper region 38 facing toward the shank 12 or transition 26 of the tool 10. In the exemplary embodiment of FIG. 15c, the contact point 42 is arranged between the center of the cutting edge 14 and the shank 12 or transition 26.

The angle of inclination α decreases step by step from FIG. 15a to FIG. 15b and FIG. 15c. Accordingly, the contact point 42 shifts from bottom to top.

The choice and determination of the angle of inclination α and thus of the contact point 42 can be controlled very precisely, exploited in many situations in an advantageous but different manner, as it were, and selected for the purposes of an optimal milling technology effect.

The contact point 42 of the cutting edge 14 or the angle of attack α can be maintained unchanged within a fillet 32 from contact path 40, 40', 40" to contact path 40, 40', 40" or differ partially or completely. In the case of a downwardly oriented contact path 40, a contact point 42 in the upper region 38 is usually advantageous for achieving technologically optimal sickle-shaped material engagement; in the case of an upwardly oriented contact path 40, a contact point 42 in the lower region 36 of the cutting edge 14 is usually advantageous for the same purpose.

Figure 16A:
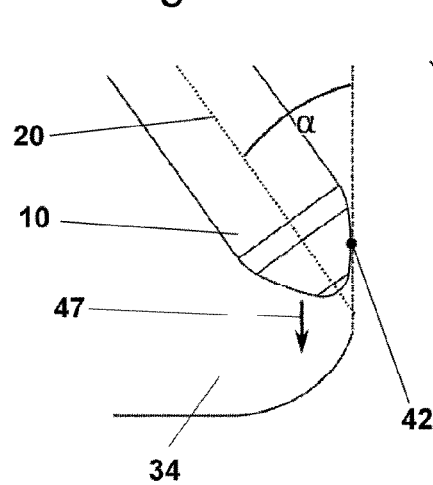
FIGS. 16a to 16c show schematic, partially broken-away side views orthogonal to the plane of inclination of the embodiment of the tool according to the invention with different inclinations relative to a fillet or rounded surface in order to explain the method according to the invention.
Figure 16B:
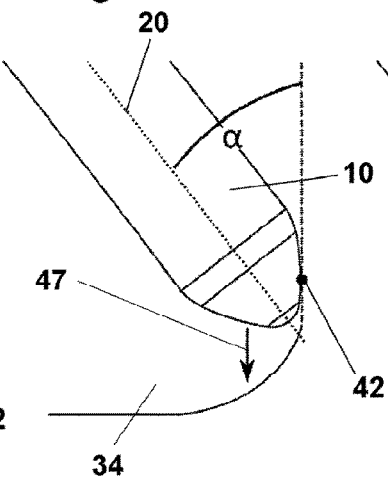
Figure 16C:
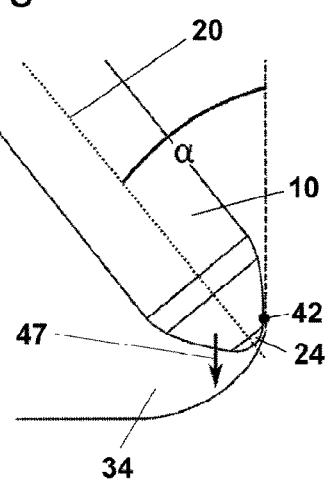

According to FIGS. 16a to 16c, the contact point 42 can also vary partially or completely over the course of a contact path 40 in the method according to the invention. For instance, in the case of a downwardly oriented contact path 40 at the lower end of a fillet 32 or contact path 40, shifting the contact point 42 to the lower end 36 of the cutting edge 14 can be advantageous by virtue of an increase in the angle of attack α in order to make better use of the tip 24 for machining the region near the ground and avoid leaving material residues there. Such shifting of the contact point 42 can be preferably continuous, resulting in a gradual increase in the angle of attack α. Alternatively or in addition, the shifting of the contact point 42 can also be performed discontinuously or stepwise or abruptly, with a corresponding increase in the angle of attack α.

FIGS. 16*a* to 16*c* show a tool 10 with different angles of attack α. The inclination α of the tool 10 increases continuously in the embodiments from FIG. 16*a* and FIG. 16*b* to FIG. 16*c*. As a result, when approaching the bottom region of the workpiece 34, the contact point 42 is shifted downward approximately from the center to the tip 24 of the tool 10.

If no bottom region is present, as in the example in FIG. 6*d*, then no such shifting of the contact point 42 is required, meaning that the contact point 42 can then be maintained unchanged on the entire contact path 40.

In the case of the embodiments with additional rows 46', 46" or layers of contact paths 40, 40', 40", the angle of attack α can be determined individually for each row 46, 46', 46" and contact path 40, 40', 40" while optionally also taking into account the shape of the resulting intermediate surfaces of the individual rows 46, 46', 46".

Figure 17A:
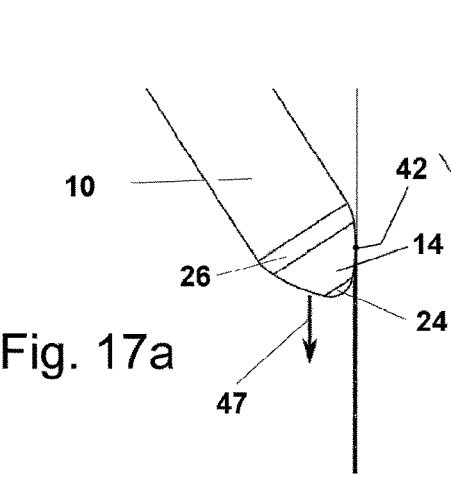
FIGS. 17a to 17c show schematic, partially broken-away and enlarged side views of the embodiment of the tool according to the invention with a fillet or rounded surface in order to explain the method according to the invention.
Figure 17B:
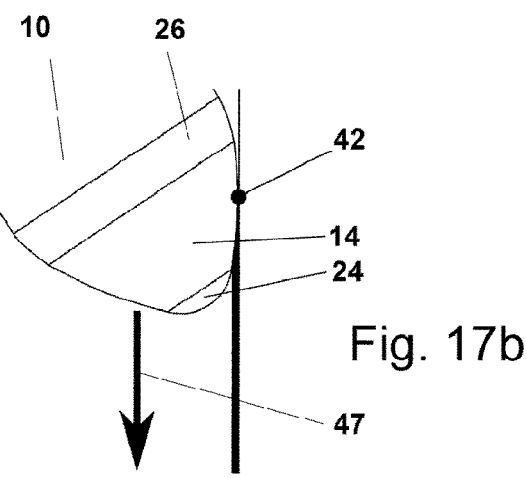
Figure 17C:
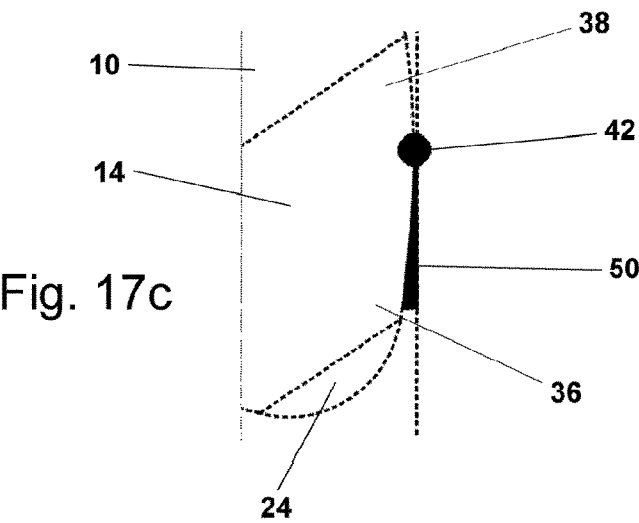

FIGS. 17*a* to 17*c* illustrate sickle-shaped material engagement 50 that is produced by the cutting edge 14 with conical-convex cutting edge contour 18 during the movement of the tool 10 in the longitudinal direction on the machined fillet 32 and is, as already stated, essential to the invention.

The sickle-shaped material engagement 50 is seen between the contact point 42 and the region 36 of the lower end of the cutting edge 14 during a downward longitudinal movement (piercing-type machining). In the case of a longitudinal movement upward in the opposite direction, i.e., an upwardly oriented longitudinal movement (drawing-type machining), the sickle-shaped material engagement 50 is located above the contact point 42 in the region 38 of the upper end of the cutting edge 14. In this way, cutting conditions can be surprisingly obtained that are comparable to those of a so-called high-feed milling cutter, which is often used in the finish machining of substantially horizontal, flat surfaces.

By virtue of the high-feed-like cutting conditions, the conical-convex tool can be moved at extremely high feed rates in the longitudinal direction for the purpose of piercing- or drawing-type machining. The sickle-shaped material engagement 50 prevents drifting of the tool 10 and excessive generation of heat. In addition, due to a substantially smaller diameter of the tool 10 in the region of the cutting edge 14, less deflection can be achieved on account of the improved delivery of cutting forces into the shank 12, again with the consequence of enhancing the stability of the tool 10. This also has a highly advantageous effect in high-speed machining.

In a fourth step, the tool 10 is swiveled by a suitable swivel angle β parallel to the fillet 30 when collisions are detected according to FIGS. 18*a* to 18*f*.

When determining the angle of attack α or the contact point 42 in the third step of the method according to the invention, only the geometry of the cutting edge 14 of the tool 10 is of interest. The other parts of the tool structure, particularly tool holder 28, extensions, etc., may need to be considered subsequently as well. These may possibly collide during machining along the contact paths 40 with the surrounding component geometry. Collision avoidance is then required, which is achieved according to the invention through the aforementioned swiveling by an angle β.

Figure 18A:
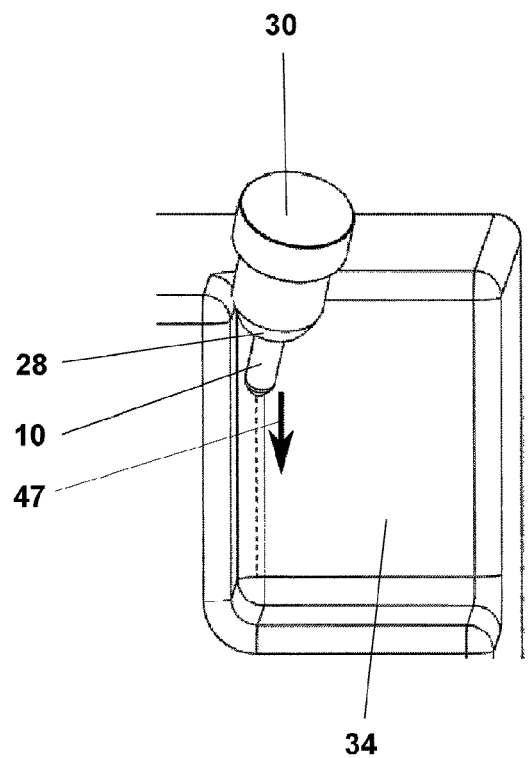
Figure 18B:
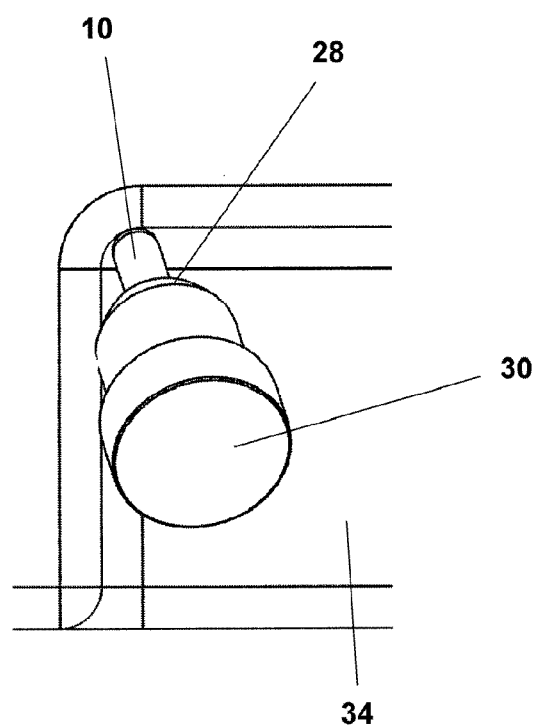
Figure 18C:
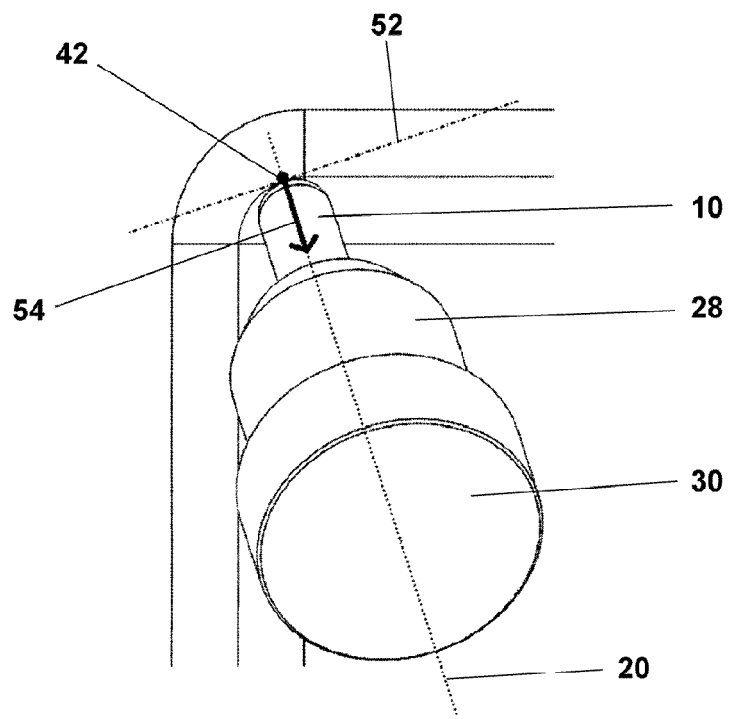

As shown in FIGS. 18*a* to 18*c*, a particularly wide tool holder 28 can cause a collision on the left side, for example, so that only a short initial portion of the depicted contact path 40 can be passed through without problems. To avoid such situations, the tool 10 can be swiveled in a suitable manner counter to the component geometry in question.

Figure 18D:
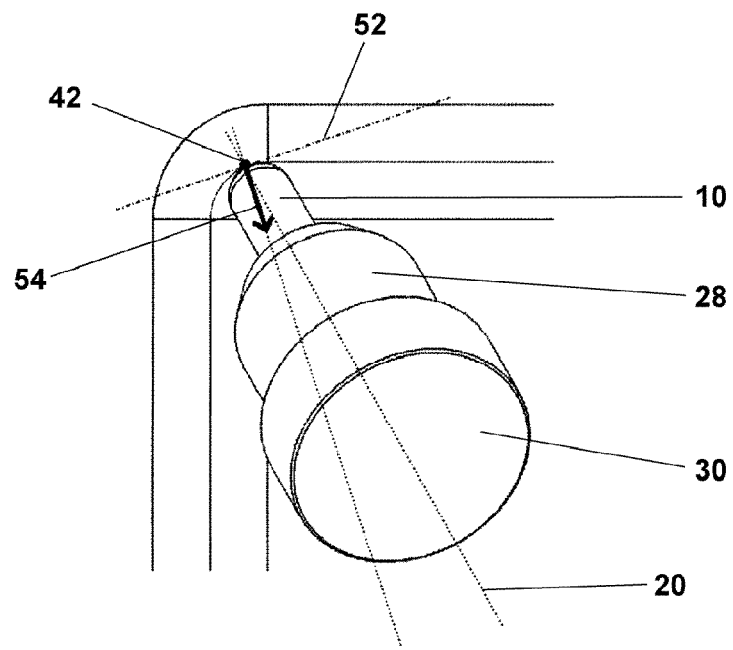

According to FIGS. 18*c* to 18*e*, the tangent plane 52 is first determined by the contact path 40, 40', 40" or the contact point 42 on the fillet 32.

In the course of a contact path 40, 40', 40", the tangent plane 52 results from the normal vector 54 of the fillet 32 in the respective contact point 42. The normal vector 54 is perpendicular to the tangent plane 52. In the case of a singly curved fillet 32'", the tangential plane 52 40, 40', 40" is the same everywhere along a contact path, but in the case of a doubly curved fillet 32", it changes along a contact path 40, 40', 40".

Subsequently, as shown in FIGS. 18*d* and 18*e*, the tool 10 is swiveled by a sufficiently large angle β parallel to the tangential plane 52 against the colliding component geometry. FIG. 18*d* shows the rotated or swiveled tool 10 with normal vector 54 at the contact point 42, with the new tool axis 20 in relation to the original tool axis and without angle β, whereas FIG. 18*e* shows the rotated or swiveled tool 10, transparently, with the contact point 42, the normal vector 54, the new tool axis 20, and the angle β being shown as an angle of rotation about the normal vector 54.

This means that the normal vector 54 of the tangent plane 52 acts as a rotation axis at the contact point 42 about which the tool 10 is rotated by the angle β. This is swiveling "parallel to the tangent plane" for the reason that, after such a rotation, each point on the tool 10 and the tool holder is the same distance from the tangent plane 52 as before the rotation.

It can also be seen in FIGS. 18*d* to 18*f* that the tool holder 28 maintains a certain distance from the colliding component geometry after swiveling. The machining can now be carried out completely along the contact path 40.

The swivel angle β must thus be determined separately for each collision contact path 40, 40', 40" according to the respective collision situation and is therefore generally not the same for all paths.

Finally, in a fifth and final step, the tool path is calculated and generated. For machining in the milling machine, a tool path is required that describes the movement of the tool 10 relative to a fixed reference point (for example, the tip 24 of the tool 10). This tool path can be derived directly from the contact paths 40, the tool geometry, the angles of attack, and optionally the swivel angles β. All contact paths 40 are thus grouped together in reusable form in a tool path and interconnected according to the selected directions of passage and the passage sequence.

Finally, the tool path is also supplemented with feed rate information. As described, the feed rate can be set very high due to the advantageous sickle-shaped material engagement 50 and the high-feed cutting conditions, namely up to 10 times the feed rate of conventional cherry machining. It can vary between the individual passed contact paths and also within a contact path. The feed rate should be selected in accordance with the tool geometry, the path spacing, the depth and length of the material engagement, the contact point 42, the direction of passage, and possibly other parameters.

For example, in the case of an upwardly oriented contact path 40 ("drawing-type" machining), the feed rate can be set even higher than in the case of a downwardly oriented contact path 40 ("piercing-type" machining), since the drawing-type machining has an additional positive influence on tool stability and reduces vibrations even more.

A feed rate that varies in the course of a contact path 40 can be used for the embodiment according to FIGS. 16*a* to 16*c*, for example. It is thus advantageous to adjust the feed rate continuously in the course of the shifting of the contact point 42. It is reduced gradually the farther the contact point 42 is shifted downward in order to ensure consistent stability of the tool 10.

The invention is not limited to the depicted embodiments of the method according to the invention corresponding to FIGS. 1*a* to 18*e*. To wit, it is possible to combine the embodiments of the method according to the invention among and with one another as desired, it being particularly possible to carry out the various steps in any desired different order. Although not shown in detail, it is also conceivable for two or more contact paths 40, 40', 40" to be provided for machining and producing the fillet 32, 32', 32" which do not have constant spacing as indicated in several of the preceding exemplary embodiments, but rather alternatively or cumulatively have variable or mutually different spacing. Likewise, it is possible according to the invention—for example when machining and producing a twice- or doubly curved fillet 32'—to provide two or more contact paths 40, 40', 40" that do not run parallel to one another, but rather alternatively or additionally converge or diverge in the manner of a funnel or bundle, for example. Similarly, two or more such contact paths 40, 40', 40" can also be combined with and among one another, even only partially. Finally, the invention is completely independent of the type of machining, i.e., particularly of rough, finish or pre-finish machining, even if the method according to the invention is preferably and particularly well suited for use in chip-removing finish and pre-finish machining.

The invention claimed is:

1. A method for material-removing machining of fillets on a workpiece by means of a tool that is guided with a constant or varying contact point of the tool on a fillet, wherein the fillet comprises a juncture of two adjoining surfaces that define a corner having an angle therebetween such that the fillet connects the two adjoining surfaces of the workpiece with a round, tangentially adjoining transition on both sides of the fillet, the fillet being machined by means of the, wherein the tool has a conical-convex cutting edge contour on a flank of the tool, wherein the contact point of the tool is positioned on the conical-convex cutting edge contour on the flank of the tool, wherein the tool is moved with the contact point on a plurality of contact paths extending in a longitudinal direction of the fillet and is inclined sideways relative to the fillet, thus causing substantially sickle-shaped material engagement in the direction of movement of the tool in front of the contact point, the material engagement being formed between the contact point and at least one of a region of a lower end of the cutting edge contour or a region of an upper end of the cutting edge contour.

2. The method as set forth in claim 1, wherein the tool is guided over the fillet and inclined sideways relative to the fillet on the at least one contact path extending in the longitudinal direction of the fillet such that the contact point of the conical-convex cutting edge contour on the flank of the tool abuts against the fillet in a lower region facing toward the end face of the tool between the center of the cutting edge contour and end face of the tool.

3. The method as set forth in claim 1, wherein the tool is guided over the fillet and inclined sideways relative to the fillet on the at least one contact path extending in the longitudinal direction of the fillet such that the contact point of the conical-convex cutting edge contour on the flank of the tool abuts against the fillet in a central region between shank and end face of the tool.

4. The method as set forth in claim 1, wherein the tool is guided over the fillet on the at least one contact path extending in the longitudinal direction of the fillet such that the contact point of the conical-convex cutting edge contour on the flank of the tool abuts against the fillet in an upper region facing toward the shank of the tool between the center of the cutting edge contour and shank of the tool.

5. The method as set forth in claim 1, wherein the contact point of the conical-convex cutting edge contour on the flank of the tool is varied individually on different contact paths.

6. The method as set forth in claim 1, wherein the workpiece is machined by the tool that is swiveled by a swivel angle parallel to the tangent plane at the contact point of the fillet in order to avoid a collision.

7. The method as set forth in claim 1, wherein the tool is guided line by line over the fillet on contact paths extending in the longitudinal direction of the fillet.

8. The method as set forth in claim 1, wherein the tool is guided unidirectionally and/or in a zigzag pattern and/or in mixed fashion over the fillet on contact paths extending in the longitudinal direction of the fillet.

9. The method as set forth in claim 1, wherein the tool is guided over a fillet that is embodied as an internal or external fillet) on contact paths extending in the longitudinal direction of the fillet.

10. The method as set forth in claim 1, wherein the tool is guided over a fillet that is embodied as a singly or doubly curved fillet on contact paths extending in the longitudinal direction of the fillet in a linear or curved manner.

11. The method as set forth in claim 1, wherein the tool is guided over a fillet that extends vertically or substantially vertically on contact paths extending in the longitudinal direction of the fillet.

12. The method as set forth in claim 1, wherein the tool is moved over at least two rows or layers on the at least one contact path extending in the longitudinal direction of the fillet, with the number of contact paths of the at least two rows or layers being equal or variable.

13. The method as set forth in claim 12, wherein the number of contact paths becomes smaller in the case of an internal fillet as the spacing of the rows or layers from the internal fillet increases and larger in the case of an external fillet as the spacing of the rows or layers from the external fillet increases.

14. The method as set forth in claim 1, wherein the tool is guided over at least one surface adjoining the fillet on at least one contact path extending parallel to the longitudinal direction of the fillet.

15. The method as set forth in claim 1, wherein the conical-convex cutting edge contour on the flank of the tool is formed by a conical contour with a cone angle between the conical contour and an axis of the tool and a convex bulge emanating from the conical contour.

16. The method as set forth in claim 1, wherein the fillet is machined by means of a tool whose conical-convex cutting edge contour is formed on the flank of the tool as a circular segment, ellipse segment, or curve segment with a constant or varying radius of curvature.

17. The method as set forth in claim 1, wherein the fillet is machined by means of a tool whose conical-convex cutting edge contour is formed on the flank of the tool as a circular segment or ellipse segment with a radius of curvature $R_K$<250 mm.

18. The method as set forth in claim 1, wherein the fillet is machined by means of a tool whose conical-convex cutting edge contour on the flank of the tool transitions directly into the shank of the tool.

19. The method as set forth in claim 1, wherein the fillet is machined by means of a tool whose conical-convex cutting edge contour on the flank of the tool transitions indirectly into the shank of the tool via a rounded transition.

20. The method as set forth in claim 1, wherein the fillet is machined by means of a tool whose conical-convex cutting edge contour on the flank of the tool transitions into a flat end face of the tool.

21. The method as set forth in claim 1, wherein the fillet is machined by means of a tool whose conical-convex cutting edge contour on the flank of the tool transitions into a spherical end face of the tool.

* * * * *